(12) United States Patent
Johnmar

(10) Patent No.: US 8,943,135 B2
(45) Date of Patent: Jan. 27, 2015

(54) SYSTEM AND METHOD FOR MEASURING THE POSITIVE OR NEGATIVE IMPACT OF DIGITAL AND SOCIAL MEDIA CONTENT ON INTENT AND BEHAVIOR

(76) Inventor: Fard Johnmar, Monroe, NY (US)

( * ) Notice: Subject to any disclaimer, the term of this patent is extended or adjusted under 35 U.S.C. 154(b) by 220 days.

(21) Appl. No.: 13/557,200

(22) Filed: Jul. 24, 2012

(65) Prior Publication Data

US 2014/0032657 A1  Jan. 30, 2014

(51) Int. Cl.
G06F 15/16 (2006.01)
H04L 29/08 (2006.01)
G06Q 50/00 (2012.01)

(52) U.S. Cl.
CPC ............. *H04L 67/22* (2013.01); *H04N 221/80* (2013.01); *G06Q 50/01* (2013.01)
USPC ............. 709/204; 709/203; 709/207; 725/22; 725/23; 725/24

(58) Field of Classification Search
CPC ... H04N 21/80; H04N 21/222; H04N 21/256; H04N 21/258; H04N 21/812; H04N 21/25894
USPC .................... 725/22–24; 709/203, 207; 705/1
See application file for complete search history.

(56) References Cited

U.S. PATENT DOCUMENTS

| 6,029,195 | A | * | 2/2000 | Herz | 725/116 |
|---|---|---|---|---|---|
| 6,571,234 | B1 | * | 5/2003 | Knight et al. | 1/1 |
| 7,159,011 | B1 | * | 1/2007 | Knight et al. | 709/207 |
| 7,162,471 | B1 | * | 1/2007 | Knight et al. | 707/750 |
| RE41,754 | E | * | 9/2010 | Knight | 715/751 |
| RE43,835 | E | * | 11/2012 | Knight et al. | 707/707 |
| 2003/0046265 | A1 | * | 3/2003 | Orton et al. | 707/1 |
| 2007/0204308 | A1 | * | 8/2007 | Nicholas et al. | 725/86 |
| 2008/0109242 | A1 | * | 5/2008 | Shear et al. | 705/1 |
| 2008/0126476 | A1 | * | 5/2008 | Nicholas et al. | 709/203 |
| 2009/0007172 | A1 | * | 1/2009 | Ahanger et al. | 725/36 |
| 2009/0013347 | A1 | * | 1/2009 | Ahanger et al. | 725/36 |
| 2010/0312768 | A1 | * | 12/2010 | Shear et al. | 707/740 |
| 2013/0067510 | A1 | * | 3/2013 | Ahanger et al. | 725/34 |
| 2014/0136554 | A1 | * | 5/2014 | Moradi et al. | 707/754 |
| 2014/0176665 | A1 | * | 6/2014 | Gottlieb | 348/14.08 |

* cited by examiner

*Primary Examiner* — Thu Ha Nguyen
(74) *Attorney, Agent, or Firm* — Meister Seelig & Fein LLP

(57) ABSTRACT

A system and method for measuring the positive or negative impact of digital and social media on perceptions, intent and behavior are provided utilizing a computer mediated perceptual, intent and behavioral analysis engine.

14 Claims, 3 Drawing Sheets

SYSTEM AND METHOD FOR MEASURING THE POSITIVE OR NEGATIVE IMPACT OF DIGITAL AND SOCIAL MEDIA CONTENT ON INTENT AND BEHAVIOR

BACKGROUND OF THE INVENTION

At least certain aspects of this application relate generally to information management, and more particularly, to providing analytic measurement of digital and social media content.

In recent years, much attention has been focused on the evolving role of digital (Internet, mobile, etc.) and social media (blogs, social networks, Twitter, etc.) in commerce, entertainment, health and other fields. As these technologies and tools have grown in popularity, a variety of methods have been developed to help organizations and individuals understand whether these media are influencing opinion, perceptions and a range of behaviors, including purchase intent and willingness to shift or continue health habits.

One set of tools is known as digital and social media analytics. Digital/social media analytics involves collecting information on content volume (proportion of information on a specific topic versus another), user actions (visits, clicks, shares, Facebook "Likes", Twitter "retweets," etc.) and information sentiment (positive negative or neutral). This information is aggregated and analyzed to inform inferences about whether content is reaching desired individuals, altering perceptions (e.g., negative content may diminish intent to purchase) and driving specific actions (e.g., site visitors from Facebook are more likely to purchase a product sold online).

However, these techniques have a number of limitations. Most importantly, assuming that negative or positive content will shape perceptions in certain ways or accelerate or diminish behaviors can lead to misaligned tactics and strategy, misunderstanding of the market and the inefficient use of financial and human resources.

The need exists for a system and method that facilitates understanding of whether content encountered in digital and social media is truly prompting intent to engage in specific behaviors. Furthermore, a system is needed for determining whether people follow through on behavioral intentions prompted by digital and social media content.

SUMMARY OF THE INVENTION

The present application provides a computer-mediated system and method for collecting analyzing and presenting data on whether digital (Web, mobile, social media, etc.) is influencing a range of perceptions (e.g., credibility, sentiment/content tonality), intentions and behaviors. Perceptual, intent and behavioral data can be collected focusing on a wide range of subjects, including news content credibility, the purchase of products and services and engaging in non- or tangentially commerce-related behaviors such as shifting diet and exercise patterns or filling a prescription.

In at least one aspect, a computer implemented method for collecting behavioral data from a user is provided that includes the steps of: collecting information regarding a user's consumption of digital content using a computer device; determining at least one topic associated with the content being consumed by the user; presenting to the user on the computer device an initial survey associated with the at least one topic associated with the content being consumed, the initial survey including an inquiry regarding whether the user planned an action with regard to the at least one topic; and presenting to the user on the computer device, after the initial survey and in response to the user affirming the planned action with regard to the at least one topic, a follow on survey comprising at least one inquiry regarding whether the user performed the planned action.

In one embodiment, the consumption of digital content comprises at least one of a web page visited by the user and status updates in one or more social networking applications associated with the user.

In one embodiment, determining at least one topic associated with the content being consumed comprises scanning the data within the content and determining whether at least one keyword or word groupings relevant to a subject of inquiry is contained in the content being consumed.

In one embodiment, the at least one keyword or word groupings are obtaining by the computer device from at least one server and wherein the determination of whether the at least one keyword or word groupings is contained in the content being consumed is performed locally by the computer device.

In one embodiment, the consumption of digital content comprises at least one of a web page visited by the user and status updates in one or more social networking applications associated with the user, wherein determining at least one topic associated with the content being consumed comprises scanning the data within the content and determining whether at least one keyword or word groupings relevant to a subject of inquiry is contained in the content being consumed, and wherein the surveys are present to the user in response to determining that the least one keyword or word groupings relevant to a subject of inquiry are contained in the content being consumed at a threshold frequency.

In one embodiment, the surveys are present to the user in response to determining that the least one keyword or word groupings relevant to a subject of inquiry are contained in the content being consumed at a threshold frequency associated with web content and a threshold frequency associated with status updates.

In one embodiment, the method further includes, in response to determining that at least one topic associated with the content being consumed by the user, logging a time, URL, Page Title, Content, and Keyword associated with the content being consumed in a database.

In one embodiment, the initial survey comprises a list of pre-developed survey questions associated with a subject inquiry, the questions including an inquiry regarding how the user perceives the credibility and the tone of the content being consumed.

In one embodiment, the planned action comprises purchasing a product or service (or engaging in some other action) after consuming the content.

In one embodiment, the follow on survey comprises at least one question regarding whether the user purchased the product or service.

In one embodiment, the follow on survey comprises at least one question regarding whether the content consumed influenced the decision whether to purchase the product or service.

In one embodiment, the method further includes: storing survey responses in a database in association with the content being consumed; computing an Intent Score for the content being consumed based on a number of affirmative and a number of negative responses regarding whether the user planned an action with regard to the at least one topic; and computing an Impact Score for each of a plurality of influencing sources.

In one embodiment, the plurality influencing sources comprises at least two of digital/social media, offline media, and advertising.

In one embodiment, the method further includes presenting an interface screen comprising.

DETAILED DESCRIPTION OF THE INVENTION

Figure 1:
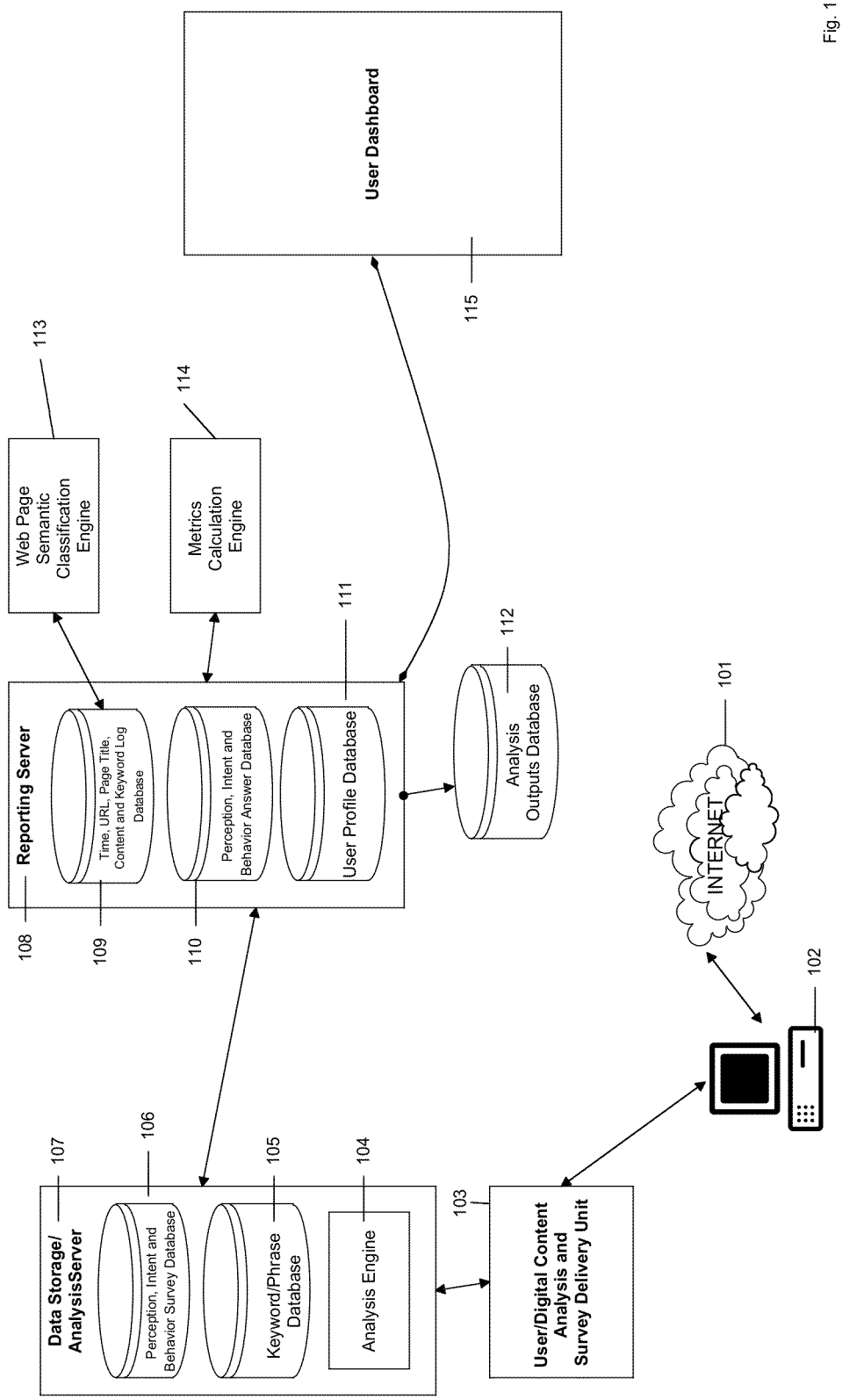
FIG. 1 is a system diagram illustrating the collection and flow of perceptual, intent and behavioral data from a digital media consuming computing device to a database for analysis and display via a user dashboard.

Referring now to FIG. 1, a block diagram illustrating how perceptual, intent and behavioral data is collected from an individual using a computer device 102 (e.g., desktop/laptop computer, smartphone device, tablet, or other Web interfacing technology) coupled to one or more server computers 107, 108 over a communication network, such as the Internet 101.

Individuals consuming digital and social media content via the Internet 101 generally install the User/Digital Content Analysis and Survey Delivery Unit 103 onto their computer or device 102. (The Unit 103 may also be pre-installed into a range of devices.) The Unit 103 may be a standalone application that interfaces with a web browser or social networking application, a plug-in for a browser application, a component of a device that aggregates digital data such as text messages, video and e-mail, etc. to collect relevant data therefrom. As individuals access the Internet 101, for example, using a web browser (or other digital device and/or application that interfaces with the Internet 101), the Unit 103 analyzes digital content being consumed by the user of the device 102 (produced in a range of languages) to determine the topic or topics of the content being consumed. This may be achieved in a variety of ways, including, for example, using the following method, outlined below.

In one embodiment, the Unit 103 scans the source code or data within digital content consumed (e.g., Web pages) to determine the presence of keywords and word groupings (or phrases) relevant to the subject of inquiry as discussed in greater detail below (e.g., the inquiry may be whether there is any interest by the user of the device 102 regarding the diabetes insulin medication Lantus).

Unit 103 may also request and capture demographic and socioeconomic data, such as gender, age, income level, residence country, state, city, etc., from individuals who are using Unit 103 on the device 102 to aid analysis, interpretation, collection and display of data in the User Profile Database 110, Analysis Outputs Database 112 and/or User Dashboard 115.

To further illustrate these concepts, an example is presented in which Unit 103 scans content contained on sites used by digital/social media content users, such as users of Google, Facebook, Twitter, MySpace, etc. In this situation, Unit 103 may collect incoming status update (i.e., posts by the user or by individuals within the social network of the user of the device 102) data from Twitter, Facebook and other sites, and transmit this information to one or more of the servers 104, 107 for storage in the Time, URL, Page Title, Content and Keyword Log Database(s) 109, 110. The Unit 103 may also log the time of visit, page title, URL and content of Web pages visited, (e.g., URL: www.google.com, Page Title: Google) and transmits this data to one or more of the servers 104, 107 for storage in the Time, URL, Page Title, Content and/or Keyword Log Database(s) 109, 110. The data discussed herein may be collected and transmitted separately or at the same time.

In at least one embodiment, the Unit 103 check for keywords present in content of sites being used and/or status update data that are relevant to the subject of inquiry. To determine this, the Unit 103 communicates with the Data Storage/Analysis Server 107, which has access to a Keyword/Phrase Database 105, to obtain therefrom keywords and/or phrases for use by Unit 103 for the subject of inquiry. The keywords and/or phrases may be collected by the unit 103 in advance of the check and may use this data each time the user visits a site, receives status updates or other data from the Internet.

Unit 103 may then analyze the keywords and/or phrases obtained from the Keyword/Phrase Database 105 to determine if a relevant keyword and/or phrase is contained in the Web page and/or in the status update content; if so, this keyword and/or phrase is logged and transmitted to the Time, URL, Page Title, Content and Keyword Log Database 109. Alternatively, the URL and other information regarding the page visited and/or status update content may be communicated to the server 107 by the Unit 103 for the server to perform this analysis remotely from the Unit 103.

To ensure the content is truly relevant, the Unit 103 and/or server 107 may employ an algorithm designed to calculate whether keyword density on Web pages and/or in status update content is at the required level. As an illustration, in the case of Lantus inquiry noted above, Unit 103 may check the Keyword/Phrase Database 105 for a listing of relevant keywords and phrases, Scan the digital data to ensure the word Lantus appears at least 5 or some other threshold amount of times in Web content, or 2 or some other threshold amount of times in status update content, and if either of these conditions are met Unit 103 determines that the content is relevant.

Whenever Web content or status updates with the appropriate keyword density is found, Unit 103 may transmit the keyword identified (and associated Web and social media content) to the Reporting Server 108. This information is logged into the Time, URL, Page Title, Content and Keyword Log Database 109.

Also, the URLs and titles of pages visited may be filtered through the Web Page Semantic Classification Engine 113. The Engine 113 parses this content, using natural language processing techniques, and classifies it by topic and media type (e.g., health, entertainment, social media, online news, etc.).

In addition, when relevant content is found, Unit 103 may communicate with the Data Storage/Analysis Server 107 and accesses the Perception, Intent and Behavior Survey database 106 for a list of pre-developed survey questions associated with the subject of inquiry focusing on: How users of Unit 103 perceive the content (e.g., its credibility and tonality/sentiment); data on perceptions can be collected using rating scales (1=low credibility; 5=highly credibility), "yes/no" questions and other techniques, and Whether users of Unit 103 intend to engage in a specific behavior (e.g., purchase a product or service) after consuming digital/social media content.

Thereafter, a survey is transmitted from the Data/Analysis Server 107 and is caused to be displayed directly within the browser of the individual using Unit 103 or in a separate user interface. At this point, the individual is prompted to respond to one or more survey questions regarding perceptions and intent relevant to the content, keyword and/or phrase associated with the subject inquiry, such as:

Please rate the credibility of this content using the following scale: 1=low credibility; 5=highly credibility.
Please tell us whether you perceive the content to be positive, negative or neutral in tone.
Do you plan to learn more about this health issue (e.g., fibromyalgia)? (Yes/No).
Are you planning on purchasing an over-the-counter remedy for flu or influenza? (Yes/No).
Do you plan on visiting your doctor for a diabetes screening? (Yes/No).

Once answers are submitted by the user of the device 102, data is transmitted to the Reporting Server 108 and logged into the Perception, Intent and Behavior Answer Database 110 along with the source (URL, social media site, etc.) of the content.

After a pre-determined period of time (for example, 14 days after an individual answered "yes" to a question regarding intent to purchase an over-the-counter remedy for influenza), Unit 103 is programmed to communicate with the Data Storage/Analysis Server 107 and access the Perception, Intent and Behavior Survey Database 106. At this point, Unit 103 checks the User Profile Database 111 and the Perception, Intent and Behavior Answer database 110 to see if an individual using Unit 103 answered "yes" to any intent question posed previously. If so Unit 103 communicates with the Data Storage/Analysis Server 107 and accesses the Perception, Intent and Behavior Survey Database 106 to retrieve a follow on survey question or questions. Follow on survey question(s) are delivered from the Data Storage/Analysis Server 107 and caused to be displayed within the users' browser or user interface. Example questions can include:
You said you were planning on purchasing an over-the-counter medication for flu, did you do so? (Yes or No)
If the answer is "Yes," these questions would be displayed:
How much was this decision influenced by content you read online? (1=Very Little 5=A lot)
How much was this decision influenced by conversations with friends, family and healthcare providers (1=Very Little 5=A lot)
How much was this decision influenced by an advertisement you read online, saw on television or heard on the radio? (1=Very Little 5=A lot).

As questions are answered, they are transmitted by Unit 103 to the Reporting Server 108 and logged into the Perception, Intent and Behavior Answer Database 110 along with the URL of the relevant web page/status update content associated with the original set of intent-related survey questions.

Figure 2:
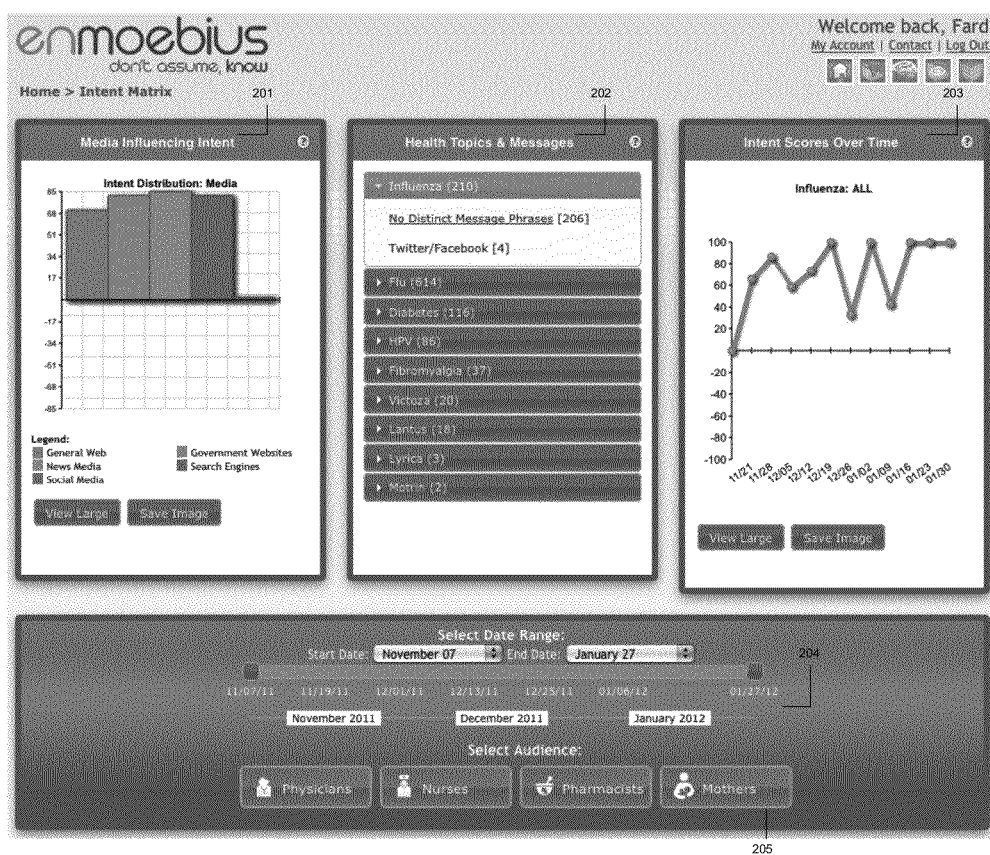
FIG. 2 is an image of a dashboard screen showing the display of intent data collected via the system.
Figure 3:
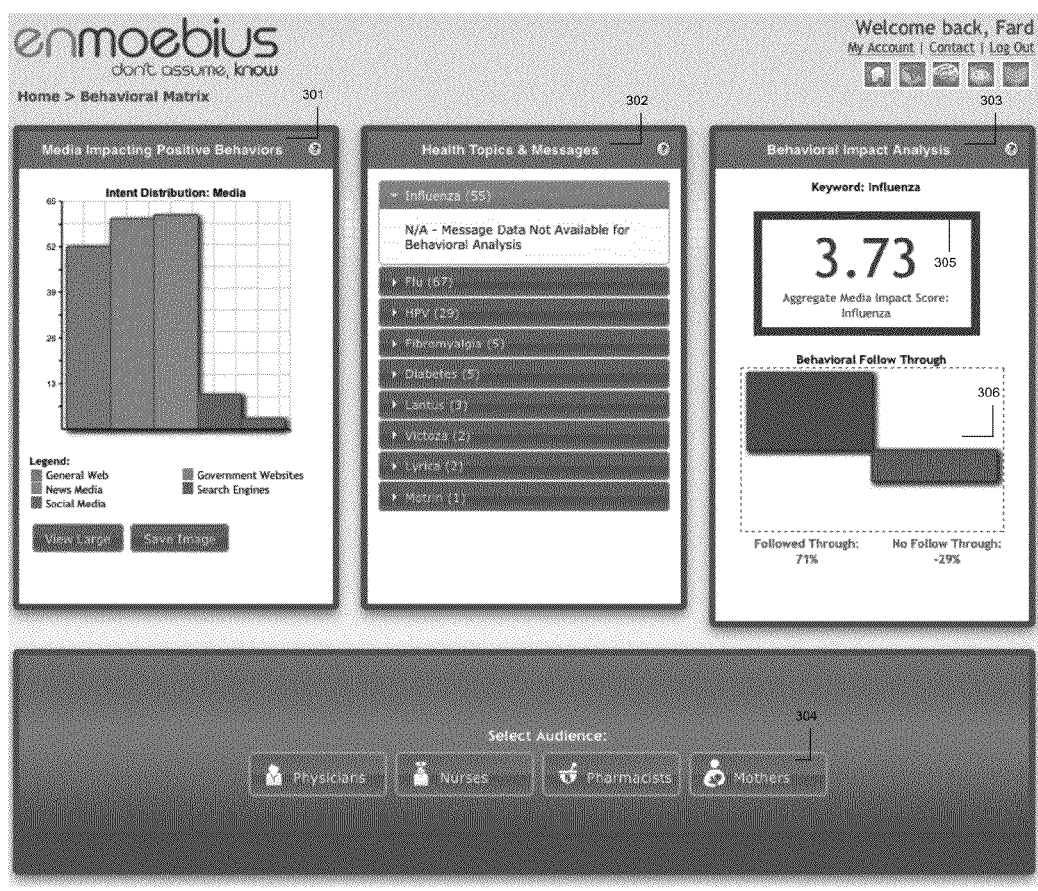
FIG. 3 is an image of a dashboard screen showing the display of behavioral data collected via the system.

FIG. 2 and FIG. 3 refer to the User Dashboard 115. The User Dashboard 115 is designed to help users visualize and analyze content, perceptual, intent and behavioral data collected via Unit 103. The dashboard answers the critical question of whether digital media content prompted behavioral intent and encouraged individuals to follow through on intended behaviors.

Data may be processed and transmitted to the User Dashboard 115 in the following manner: Data collected by Unit 103 is transmitted to the Reporting Server 108 (via the Data Storage/Analysis Server 107). Content contained within the Time, URL, Page, Title, Content and Keyword Log Database 109, the Perception, Intent and Behavior Answer Database 110 and User Profile Database 111 is transmitted to and processed by the Analysis Engine 104, which examines the data via a range of techniques, including machine learning, for various patterns and correlations, such as the primary ways in which content is encountered and the relationship between content consumption, and various demographic and social characteristics of users.

Output from the Analysis Engine 104 is transmitted to the Reporting Server 108 and stored in the Analysis Outputs Database 112 for future examination. In addition, analysis outputs are transmitted to the User Dashboard 115 via the Reporting Server 108.

Intent Answers stored in the Perception, Intent and Behavior Answer Database 110 may be analyzed using the Metrics Calculation Engine 114, a series of algorithms designed to score content on the following factors:
Percentage of Yes minus No responses×100=Intent Score: This metric indicates whether content successfully prompted intent to engage in a specific behavior. Intent scores are calculated between +100 and −100, with aggregated scores closer to the positive extreme indicating that content is especially successful at prompting people to say they will engage in a specific behavior.
Impact Scores: These are calculated using Likert Scales, as follows (scale data is averaged into a single metric to indicate impact):
Media Impact Score: 1=Digital/Social Media content had very little to do with behavior; 5=Digital/Social Media content had a lot to do with behavior; derived from answers from individuals expressing they had followed through on specific intended behaviors.
Offline Impact Score: 1=offline conversations with friends/family, loved ones, others) had very little to do with behavior; 5=offline conversations with friends/family, loved ones, others) had a lot to do with behavior; derived from answers from individuals expressing they had followed through on specific intended behaviors.
Advertising Impact Score: 1=advertising consumed via television, radio and online had very little to do with behavior; 5=advertising consumed via television, radio and online had a lot to do with behavior; derived from answers from individuals expressing they had followed through on specific intended behaviors.

An example of how this data is visualized in the User Dashboard 115 is illustrated in FIG. 2 and FIG. 3. FIG. 2 illustrates a dashboard designed to provide information on whether content influenced intent to engage in specific behaviors. The main area of the dashboard, Health Topics & Messages 202, provides information on the topics and messages encountered by individuals using Unit 103. The topics may be selected by the system based on popularity or may be selected by the user. In this example, the user may want to focus on messages regarding influenza or flu.

In the Media Influencing Intent 201 section, dashboard users can see which media had the most positive or negative impact on intent. In this example, social media had little influence on intent to get an over-the-counter flu medicine based on the answers to intent questions collected via Unit 103.

In the Intent Scores Over Time Section 203, viewers can see how Intent Scores have changed over the course of a study period.

The Date Slider Area 204 and Audience Selection Area 205 provide users with the ability to filter the data by time period and audience based on demographic data. Message, audience and time filtering is achieved via communication between the Reporting Server 108 and the User Dashboard 115. Information may be displayed in the dashboard via a series of AJAX calls that instruct the Reporting Server 108 to construct and display graphs, charts and tables on the fly in response to user-inputted queries (e.g., audience selection, time, etc.)

FIG. 3 refers to the part of User Dashboard 115 focusing on whether people followed through on the intended behaviors illustrated in FIG. 2. Via the Health Topics & Messages 302 and Audience Selection Area 304, users can filter the data by topic and audience. Commands to display tables, charts and graphs may be transmitted via a series of AJAX calls between the Reporting Server 108 and the User Dashboard 115.

In the Media Impacting Positive Behaviors 301 section, users can examine which types of media individuals following through on intended behaviors viewed. The Behavioral Impact Analysis 303 area provides information on which proportion of audiences followed through on intended behaviors based on answers to the follow up questions collected via Unit 103 and the aggregate Media Impact Score 305 for the topic and message group. The Behavioral Follow Through 306 area illustrates what percentage of Unit 103 users followed through on intended behaviors.

See below for a table illustrating sample data aggregated for display within User Dashboard 115.

| Reporting Server 108 - Time, URL, Page Title Content and Keyword Log Database 109 | | | | |
|---|---|---|---|---|
| URL | PAGE TITLE | KEYWORD | PHRASE | DATE/TIME |
| http://www.diabetes.org/living-with-diabetes/recently-diagnosed/ | Recently Diagnosed - American Diabetes Association | Diabetes | Diagnosed | 5/19/11 16:44 |

| Reporting Server 107-108 - Perception, Intent and Behavior Answer Database 110 (Intent Answers) | | | | | | |
|---|---|---|---|---|---|---|
| USER | KEYWORD | PHRASE | TIME/DATE | URL | ANSWER | INTENT SCORE |
| 12345678 | Diabetes | Diagnosed | 5/19/11 16:45 | http://www.diabetes.org/living-with-diabetes/recently-diagnosed/ | Yes | 100 |
| 789101112 | Influenza | OTC Medicine | 6/12/11 12:45 | http://www.medicinenet.com/cold_flu_allergy/article.htm | No | −100 |

| Reporting Server 108 -Perception Intent and Behavior Answer Database 110 (Behavior Answers) | | | |
|---|---|---|---|
| USER | KEYWORD | ANSWER A | DIGITAL/OFFLINE IMPACT |
| 12345678 | Diabetes | Yes | 5 |

| Reporting Server 108 - User Profile Database 111 | | | | | | |
|---|---|---|---|---|---|---|
| USER | USER TYPE | GROUP | GENDER | AGE | ETHNICITY | COMMUNITY |
| 12345678 | Mother | Minority | F | 25-39 | Hispanic | Suburban |

The advantages of the methods and systems provided by the present application include, without limitation, that it solves the difficult problem of measuring whether digital media content is truly impacting perceptions, intentions and behaviors that matter to organizations and individuals utilizing these technologies to communicate, persuade and educate. In addition, data collected and illustrated via the invention can provide important information on which digital/social media content and messages are most cost effective, efficient and impactful.

In broad embodiment, the present application provides a digital and social media perceptual, intent and behavioral analysis engine.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A computer implemented method for collecting behavioral data from a user comprising:

collecting a user's consumption of digital content using a computer device communicatively coupled to a network, the user's consumption of digital content collected from a network interfacing unit of the computer device that scans the data within the digital content;

determining at least one topic associated with the digital content being consumed by the user based on the data scanned by the network interfacing unit;

presenting to the user on the computer device an initial survey associated with the at least one topic associated with the content being consumed, the initial survey including an inquiry regarding whether the user planned an action with regard to the at least one topic;

identifying the user affirming the planned action with regard to the at least one topic based on a response to the inquiry;

presenting to the user on the computer device, after the initial survey and in response to the user affirming the planned action with regard to the at least one topic, a follow on survey comprising at least one inquiry regarding whether the user performed the planned action; and determining an ability of the digital content to influence and cause the user to follow through on the planned action based on at least a response to the at least one inquiry regarding whether the user performed the planned action.

2. The method of claim 1, wherein the consumption of digital content comprises at least one of a web page visited by the user and status updates in one or more social networking applications associated with the user.

3. The method of claim 1, wherein determining at least one topic associated with the content being consumed comprises scanning the data within the content and determining whether at least one keyword or word groupings relevant to a subject of inquiry is contained in the content being consumed.

4. The method of claim 3, wherein the at least one keyword or word groupings are obtaining by the computer device from at least one server and wherein the determination of whether the at least one keyword or word groupings is contained in the content being consumed is performed locally by the computer device.

5. The method of claim 1, wherein the consumption of digital content comprises at least one of a web page visited by the user and status updates in one or more social networking applications associated with the user, wherein determining at least one topic associated with the content being consumed comprises scanning the data within the content and determining whether at least one keyword or word groupings relevant to a subject of inquiry is contained in the content being consumed, and wherein the surveys are present to the user in response to determining that the least one keyword or word groupings relevant to a subject of inquiry are contained in the content being consumed at a threshold frequency.

6. The method of claim 5, wherein the surveys are present to the user in response to determining that the least one keyword or word groupings relevant to a subject of inquiry are contained in the content being consumed at a threshold frequency associated with web content and a threshold frequency associated with status updates.

7. The method of claim 1, comprising, in response to determining that at least one topic associated with the content being consumed by the user, logging a time, URL, page title, content, and keyword associated with the content being consumed in a database.

8. The method of claim 1, wherein the initial survey comprises a list of pre-developed survey questions associated with a subject inquiry, the questions including an inquiry regarding how the user perceives the credibility and the tone of the content being consumed.

9. The method of claim 1, wherein the planned action comprises purchasing a product or service after consuming the content.

10. The method of claim 9, wherein the follow on survey comprises at least one question regarding whether the user purchased the product or service.

11. The method of claim 10, wherein the follow on survey comprises at least one question regarding whether the content consumed influenced the decision whether to purchase the product or service.

12. The method of claim 1, comprising:
storing survey responses in a database in association with the content being consumed;
computing an Intent Score for the content being consumed based on a number of affirmative and a number of negative responses regarding whether the user planned an action with regard to the at least one topic; and
computing an impact score for each of a plurality of influencing sources.

13. The method of claim 12, wherein the plurality influencing sources comprises at least two of digital/social media, offline media, and advertising.

14. The method of claim 12, comprising presenting an interface screen.

* * * * *